J. Sanders,
Steam Gage Cock.

N°65,511.    Patented June 4, 1867.

Witnesses

Inventor
James Sanders

United States Patent Office.

JAMES SANDERS, OF EAST BOSTON, ASSIGNOR TO HIMSELF AND NOAH H. MARSTON, OF BOSTON, MASSACHUSETTS.

Letters Patent No. 65,511, dated June 4, 1867.

IMPROVEMENT IN STEAM GAUGE-COCKS.

The Schedule referred to in these Letters Patent and making part of the same.

TO ALL WHOM IT MAY CONCERN:

Be it known that I, JAMES SANDERS, of East Boston, in the county of Suffolk, and State of Massachusetts, have invented certain improvements in Gauge-Cocks for Steam Boilers, of which the following is a full, clear, and exact description, reference being had to the accompanying drawing, making part of this specification, in which—

Figure 1:
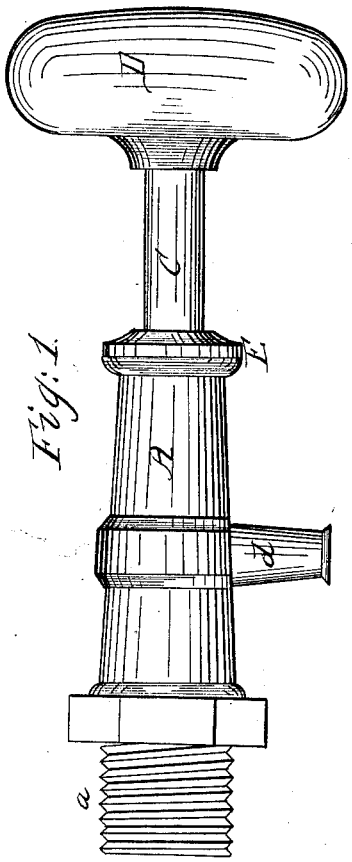
Figure 1 is a side elevation of my improved gauge-cock.
Figure 2:
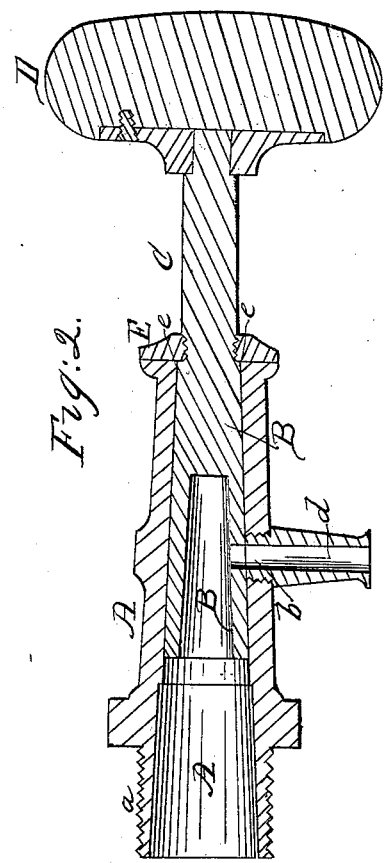
Figure 2 is a longitudinal vertical section through the centre of the same.

My invention has for its object to furnish a reliable gauge-cock of simple construction which may be furnished at a low cost, and consists in a shell or casing having a tapering hole bored through it longitudinally, in which is fitted a hollow conical plug provided with a spindle extending beyond the outer end of the shell, and furnished with a knob or handle by which it may be turned to open or close the cock, the steam or water passing through an opening in the plug to the nozzle when the cock is open, and the pressure of the steam against the conical plug serving to force it forward into the shell for the purpose of keeping it in place and insuring a tight joint.

To enable others skilled in the art to understand and use my invention, I will proceed to describe the manner in which I have carried it out.

In the said drawings, A is the shell or outer casing of the cock, the rear portion $a$ of which is screwed into the boiler in the ordinary manner. Within the interior of this shell A, which is bored out tapering, is fitted a hollow conical plug, B, having its rear end open to admit the steam. This plug, which is ground so as to fit accurately the inner surface of the shell, is provided with a spindle, C, which extends out through the end of the shell, and has secured to its outer extremity a knob or handle, D, by which it may be turned to bring the opening $b$, which communicates with the interior of the hollow plug, opposite to the opening in the nozzle $d$, through which the steam or water from the boiler will escape as required, the passage being closed by simply turning the handle D slightly to one side or the other, so as to carry the hole $b$ away from the nozzle $d$. It will be seen that the pressure of the steam against the hollow conical plug B will tend to force it into the tapering shell, and thus insure a tight joint. But to guard against any liability of burning the hands which might arise from accidentally pushing in the stem and plug, and allowing the steam to escape at the end of the shell, a nut, E, is screwed on to the spindle C, which bears against the end of the shell and prevents the plug from being pushed inward, the nut resting against the shoulder $c$, which allows it to be revolved freely with the spindle.

The above-described gauge-cock possesses few parts, is of simple construction, and free from leakage, while it may be furnished at a moderate cost.

It is evident that my improvements may be applied to cocks of other descriptions beside gauge-cocks; for instance, to water-cocks.

*Claim.*

What I claim as my invention, and desire to secure by Letters Patent, is—

The hollow conical plug B, with its spindle C and opening $b$, in combination with the shell or casing A, the interior of which is of a tapering form, all arranged and operating substantially as and for the purpose set forth.

JAMES SANDERS.

Witnesses:
P. E. TESCHEMACHER,
N. W. STEARNS.